(12) United States Patent
Kako et al.

(10) Patent No.: US 11,052,675 B2
(45) Date of Patent: Jul. 6, 2021

(54) PRINTER

(71) Applicant: BROTHER KOGYO KABUSHIKI KAISHA, Nagoya (JP)

(72) Inventors: Keigo Kako, Nagoya (JP); Koichi Kondo, Inuyama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 362 days.

(21) Appl. No.: 16/233,289

(22) Filed: Dec. 27, 2018

(65) Prior Publication Data

US 2019/0299656 A1 Oct. 3, 2019

(30) Foreign Application Priority Data

Mar. 30, 2018 (JP) .............................. JP2018-068904

(51) Int. Cl.
*B41J 3/407* (2006.01)
*B41J 3/46* (2006.01)
*B41J 11/66* (2006.01)
*B41J 11/00* (2006.01)

(52) U.S. Cl.
CPC ............... *B41J 3/4075* (2013.01); *B41J 3/46* (2013.01); *B41J 11/008* (2013.01); *B41J 11/663* (2013.01)

(58) Field of Classification Search
CPC . B41J 3/46; B41J 3/4075; B41J 11/008; B41J 11/663
See application file for complete search history.

(56) References Cited

U.S. PATENT DOCUMENTS 5,677,999 A 10/1997 Hidaka et al.
2005/0201796 A1* 9/2005 Arkin ..................... B41J 11/008
400/76

FOREIGN PATENT DOCUMENTS

| JP | H07156497 A | | 6/1995 | |
|---|---|---|---|---|
| JP | 08-230242 | * | 5/1999 | ................ B41J 3/36 |
| JP | 2004025468 | * | 1/2004 | ................ B41J 3/36 |
| JP | 2006-110850 | * | 4/2006 | ................ B41J 3/36 |
| JP | 2007-026234 | * | 1/2007 | .............. B41J 21/00 |
| JP | 2008-173908 | * | 7/2008 | ............. B41J 3/4075 |

* cited by examiner

*Primary Examiner* — Matthew G Marini
*Assistant Examiner* — Marissa Ferguson-Samreth
(74) *Attorney, Agent, or Firm* — Scully, Scott, Murphy & Presser, PC

(57) ABSTRACT

The disclosure discloses a printer including a controller. The controller performs a width acquisition process, a width determination process, a first printing determination process, and a first print formation process. In the width acquisition process, a first width direction dimension of the print-receiving tape is acquired. In the width determination process, a magnitude relation between the first width direction dimension and a second width direction dimension correlated with a template. In the first printing determination process, it is determined whether or not printing using N or less of the extraction print zones is performable, in the case that the first width direction dimension is smaller than the second width direction dimension. In the first print formation process, the printing head and the feeder form a print using a print object arranged in the extraction print zone in the case that the printing using the extraction print zones is performable.

8 Claims, 9 Drawing Sheets

PRINTER

CROSS-REFERENCE TO RELATED APPLICATION

The present application claims priority from Japanese Patent Application No. 2018-068904, which was filed on Mar. 30, 2018, the disclosure of which is incorporated herein by reference in its entirety.

BACKGROUND

Field

The present disclosure relates to a printer and, more particularly, to a printer that includes a template to produce a label.

Description of the Related Art

A printer such as a label printer that enables production of a desired-shape label such as a name tag is known. This printer is configured to accept an operation to select an optional template from plural types of templates stored in advance in a template storage means and an operation to input print data, and to thereby insert the input print data into an assigned zone of the selected template.

As a result, a label formed by performing printing for its plural assigned zones such as "name of elementary school" in horizontal writing, "grade and class" in vertical writing, and "name" in vertical writing for one print tape is produced.

For this printing using the template, the width of the tape as the target is fixed and, in the case that a portion of the content (such as, for example, "grade and class") is changed, it is necessary to take a countermeasure such as newly printing the overall label again or replacing the label with a new label for only the point for the change over the point (over-bonding).

For the above, in the case that the overall label is newly printed again, because the overall print content is newly printed again, a problem that consumption of each of the labels, the ink, and the like is significant arises. On the other hand, in the case that a new label is bonded to only the point for the change, new problems such as that adjustment such as selection of each of the tape width and the format that match with those of the point for the change is necessary, that time and efforts are necessary, and, in addition, that wasted labels are generated due to failures may also arise.

SUMMARY

An object of the present disclosure is to provide a printer capable of easily producing an over-bonding label suppressing any consumption of labels.

In order to achieve the above-described object, according to the aspect of the present application, there is provided a printer comprising an attaching and detaching part configured to be attached with and detached from a container of a print-receiving tape, a feeder configured to feed the print-receiving tape supplied from the container attached to the attaching and detaching part, a printing head configured to perform printing on the print-receiving tape fed by the feeder, a controller, and a memory, the memory storing a template that N (N: a natural number) extraction print zones allocated in a desired mode, wherein each of the extraction print zones is capable of having a print object arranged in a specific format, the controller performing a width acquisition process for acquiring a first width direction dimension of the print-receiving tape in the container attached to the attaching and detaching part, a width determination process for determining a magnitude relation between the first width direction dimension acquired in the width acquisition process and a second width direction dimension that is correlated with the template stored in the memory, a first printing determination process for determining whether or not printing using N or less of the extraction print zones is performable, on the basis of a third width direction dimension correlated with the extraction print zone included in the template and the first width direction dimension in the case that it is determined in the width determination process that the first width direction dimension is smaller than the second width direction dimension, and a first print formation process for controlling the printing head and the feeder to form a print using the print object arranged in the extraction print zone on the print-receiving tape in the case that it is determined in the first printing determination process that the printing using the extraction print zones is performable.

In the printer of the present disclosure, a container of a print-receiving tape is attached to an attaching and detaching means, the print-receiving tape supplied from the container attached to the attaching and detaching means is fed by a feeding means, and printing is performed for the print-receiving tape by a printing means in the course of the feeding. During this, the control for the driving system for these is controlled by a control means using application software installed in advance in a storage means.

On the other hand, the storage means stores therein data related to a large number of template that each define arrangement (a layout) of characters and the like corresponding to the size and the like of the print-receiving tape, such that a desired printing result can easily be acquired when the printing is performed for the print-receiving tape.

For example, because the sizes in the width direction of the printable (applicable) print-receiving tape are fixed in advance (to be, for example, six types of 6 mm, 9 mm, 12 mm, 18 mm, 24 mm, and 36 mm), the storage means store therein templates each having therein a layout including more plural zones whose formats differ from each other as the width of the print-receiving tape becomes larger.

In the above, it can be assumed for the expression "the formats differ from each other" that the fact that font types and sizes, or vertical writing and horizontal writing are present being mixed with each other, and the like. For example, the storage means stores therein a rich variety of templates such as a sign that has thereon a layout including, under "Fire Prevention Assistant Supervisor" in horizontal writing, "name" of each of two persons as a main and a sub supervisors in the equal font size in two lines in vertical writing, and a name tag that has thereon a layout including, under "name of an elementary school" in horizontal writing, "grade and glass" and "name" in different font sizes in two lines in vertical writing.

As above, the storage means stores therein the templates each having N (N: a natural number) extraction print zones each for a print object to be able to be arranged therein in a specific format (such as vertical writing or horizontal writing, various types of font, and with or without decoration), allocated therein in a desired aspect.

The above "Fire Prevention Assistant Supervisor", "grade and class" and the like may each be changed due to a change of the person in charge, advancement in grade, and the like. For this, for example, in the case that "Fire Prevention Assistant Supervisor" and the one "name " are not changed and only the other "name" is changed, or the case that "name of the school" and "names" are not changed and only "grade and class" is changed, consumables such as the print-receiving tape are wasted when the overall printing is newly performed for a wide-width print-receiving tape.

The present disclosure is a countermeasure for the case that the print content of the previously printed tape is desired to be changed (to be replaced by bonding a new tape thereto) using an owned (assumed) tape and, when the print of the previously printed tape is desired to be changed, the present disclosure perform replacement of the corresponding input block portion by bonding thereto the assumed tape in an orderly manner without leaving any character printed thereunder outside the assumed tape such that the corresponding input block portion is completely covered by the assumed tape, by performing printing setting the input block width of the print on a template to be printed, to be somewhat smaller than the assumed tape width.

In a width acquisition process, the control means acquires a first width direction dimension (such as, for example, 12 mm) of the print-receiving tape in the container attached to the attaching and detaching means. In a width determination process, the control means next determines the magnitude relation between the first width direction dimension (such as, for example, 12 mm) acquired in the width acquisition process and a second width direction dimension (such as, for example, 36 mm) correlated with a template stored in the storage means.

For example, the control means detects the tape width (the first width dimension: 12 mm) of the print-receiving tape currently attached to the attaching and detaching means relative to the maximal width (the second width dimension: 36 mm) of the template and determines the magnitude relation therebetween.

In the case that the control means determines that the first width direction dimension (such as, for example, 12 mm) is smaller than the second width direction dimension (such as, for example, 36 mm), in a first printing determination process, the control means determines whether or not printing using N or less extraction print zones is performable on the basis of a third width direction dimension (such as, for example, 12 mm or 9 mm) correlated with an extraction print zone included in a template and the first width direction dimension (such as, for example, 12 mm).

The control means determines whether or not printing for the dimension in the tape width direction of each of the plural (N) extraction print zones corresponding to the template, that is, the third width direction dimension (such as, for example, 12 mm or 9 mm) is performable for the plural extraction print zones.

For example, the control means determines whether or not printing is performable for only the extraction print zone to which the other "name" in the sign or "grade and class" on the name tag described above is assigned, using the print-receiving tape in the container attached to the attaching and detaching means.

In the case that the control means determines in the first printing determination process that the printing using the extraction print zone is performable, in a first print formation process, the control means performs control for a driving system to control the printing means and the feeding means to form a print using a print object arranged in the extraction print zone on the print-receiving tape.

As above, the printer of the present disclosure is a printer that enables printing using an optional one from plural types of template prepared in advance and, in the case that plural extraction print zones arranged in one template are present, produce an over-bonding label that uses a small-tape-width template corresponding to one or more extraction print zone(s) of these extraction print zones.

DESCRIPTION OF THE PREFERRED EMBODIMENTS

An embodiment of the present disclosure will be described below with reference to the drawings.

<Configuration of Template Processing System>

The overall configuration of a template processing system including a printer of this embodiment will be described first with reference to FIG. 1.

Figure 1:
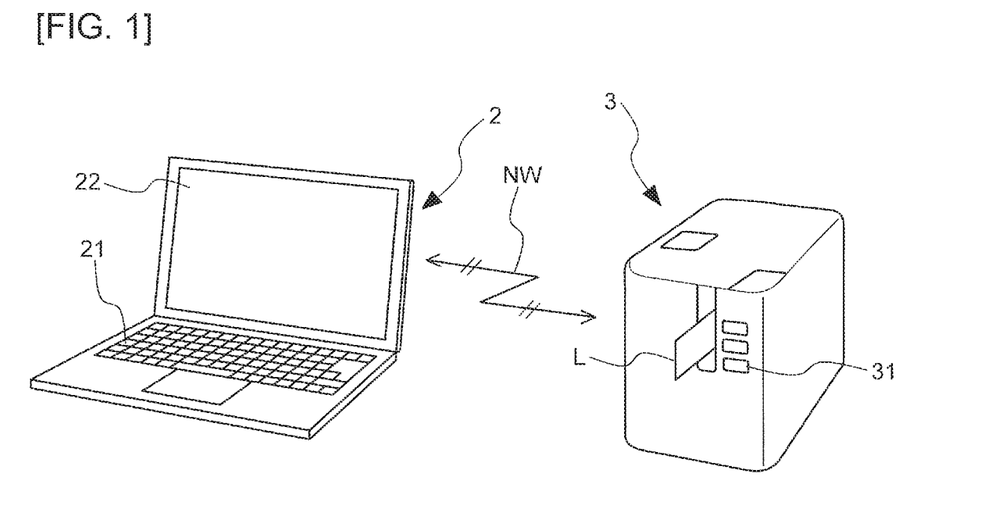
FIG. 1 is a system configuration view showing the overall configuration of a template processing system that includes a printer of an embodiment of the present disclosure.

As shown in FIG. 1, a template processing system 1 includes an operation terminal 2 and a printer 3 such as a label printer. The operation terminal 2 and the printer 3 are connected to each other to be able to communicate with each other through a network NW such as a wireless communication line including a priority communication line or the Internet line. In the case of the wireless communication line, the operation terminal 2 and the printer 3 are connected to each other to be able to communicate with each other by a wireless communication scheme such as, for example, Wi-Fi (a registered trademark) or Bluetooth (a registered trademark). The operation terminal 2 and the printer 3 may be connected to each other to be able to communicate with each other by a wired communication scheme such as a USB cable.

The operation terminal 2 includes an operation part 21 such as a keyboard and a mouse not shown and a displaying part 22 such as a liquid crystal display screen. In addition to a notebook personal computer as shown in FIG. 1, the operation terminal 2 may be, for example, a smartphone, a feature phone, a tablet terminal, a desk-top personal computer, or the like. A touch panel displaying part having some of the functions of the operation part 21 may be employed as the displaying part 22.

The printer 3 includes an operation part 31 such as a main switch, transmits and receives various types of information and various types of instruction signal through the network NW to/from the operation terminal 2, and prints a desired text, a desired image, and the like on the basis of an operation by a user using the operation terminal 2, to produce a label L.

The detailed functions of the template processing system 1 that includes the printer 3 will be described next with reference to FIG. 2.

Figure 2:
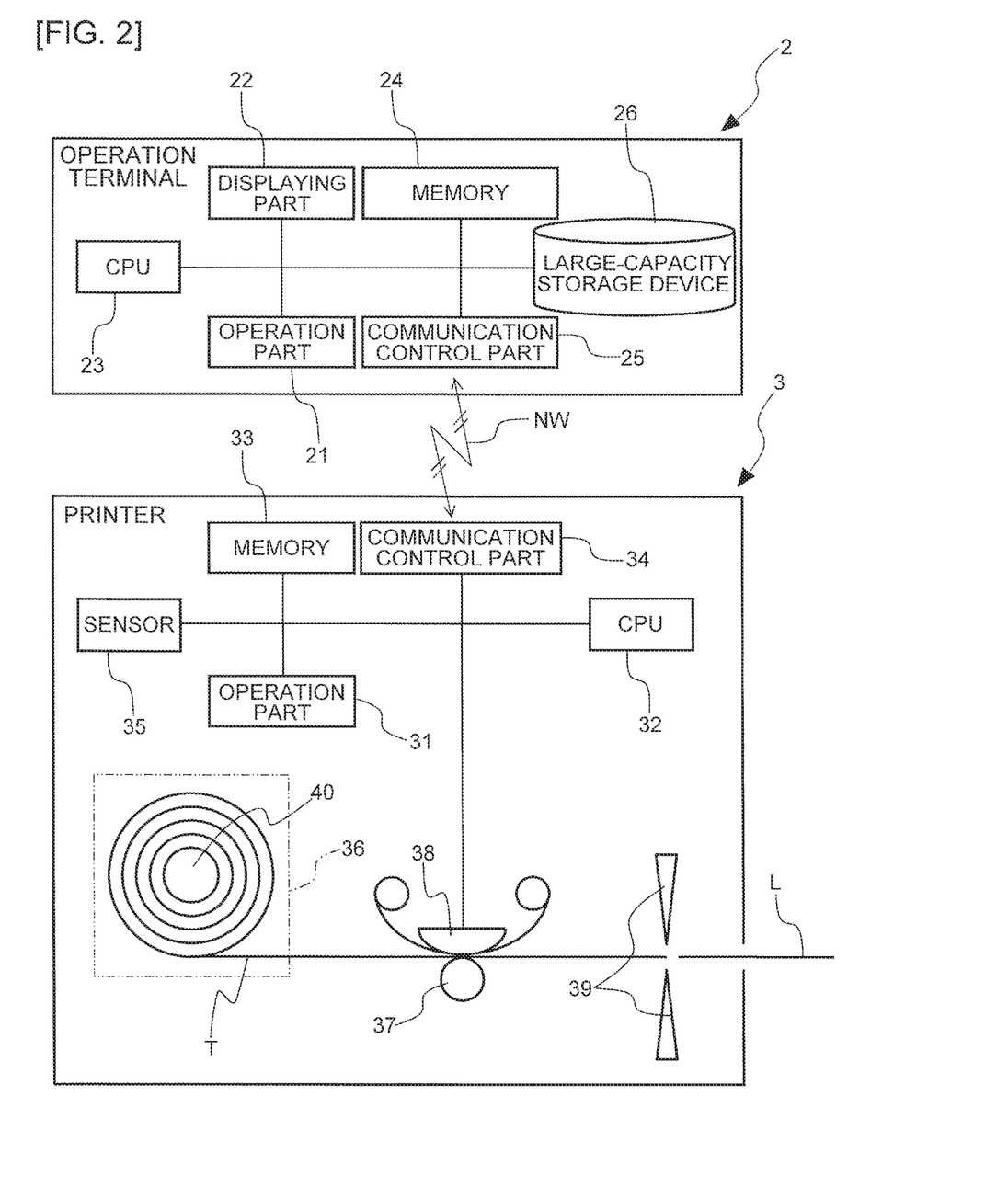
FIG. 2 is a block view showing the detailed functions of the template processing system.

As shown in FIG. 2, the operation terminal 2 includes a CPU 23, a memory 24 including a RAM, a ROM, and the like, a communication control part 25 having a transmission and reception functions to realize the mutual communication with the printer 3 using the network NW, and a large-capacity storage device 26 such as a flash memory.

The CPU 23 performs various types of program stored in the ROM of the memory 24 and the large-capacity storage device 26 using a temporary storage function of the RAM of the memory 24, and thereby performs control for the operation terminal 2. The memory 24 and the large-capacity storage device 26 store therein pieces of application software including an operating system for the operation terminal 2 to realize all the functions thereof as a computer, and pieces of application software such as a driver and a text editor to perform a printing function that uses the printer 3.

The communication control part 25 performs control for the communication performed between the operation terminal 2 and the printer 3 in accordance with the above communication scheme.

The large-capacity storage device 26 stores therein template processing programs to cause the CPU 23 to perform steps of a flowchart shown in FIG. 11 described later, and various types of template (strictly, data for the templates). Not limiting to the memory in the main body (an internal storage), an external memory such as an SD memory card may be used as the large-capacity storage device 26. At least some of processing function programs of the template processing programs and the templates may be stored in advance in the ROM of the memory 24, or may be stored (or concurrently used) in a memory 33 described later of the printer 3.

The printer 3 includes a CPU 32 as a control means, the memory 33 including a RAM and a ROM each as a storage means, a communication control part 34, a sensor 35, a tape roll holder part 36 as an attaching and detaching means, a feeder 37 as a feeding means, a printing head 38 as a printing means, and cutters 39.

The CPU 32 performs various types of program stored in advance in the ROM using a temporary storage function of the RAM of the memory 33, and thereby performs driving control and the like of the overall printer 3.

The RAM of the memory 33 temporarily stores therein print data received from the operation terminal 2. At least some of the processing function programs of the template processing programs and the templates may be stored in the ROM of the memory 33 as above. In this case, when the operation part 31 of the printer 3 has a character input function such as a keyboard and includes a display screen or the like, the operation terminal 2 may not be used. In the case that the template processing programs and the templates are stored in the ROM of the memory 33, these functions and the data may be usable by the operation terminal 2 as a part of the storage device of the operation terminal 2. In the description below, the description will be made assuming that the template processing programs and the templates are stored in the ROM of the memory 33. It is also assumed that the templates stored in the memory 33 include templates each having N (N: a natural number) extraction print zones each for a print object (text characters, symbols, or images) to be able to be arranged therein in a specific format (such as vertical writing or horizontal writing, various types of font, and with or without decoration), allocated therein in a desired aspect.

The communication control part 34 performs control for communication performed between the printer 3 and the operation terminal 2 in accordance with the above communication scheme.

The sensor 35 detects the tape width of a print-receiving tape T attached to the tape roll holder part 36. The sensor 35 may be a sensor that detects a tape roll 40 described later or the type of the cartridge, and thereby detects the tape width of the print-receiving tape T. The sensor 35 may also act as an empty sensor that detects the fact that the tape roll 40 (or the cartridge) attached to the tape roll holder part 36 is not attached or that the print-receiving tape T of the tape roll 40 (or the cartridge) attached to the tape roll holder part 36 is exhausted.

The tape roll 40 (that is shown as concentric circles for simplicity though that is originally has a spiral shape) as a container having the print-receiving tape T wound therein can be attached to the tape roll holder part 36 to be attached and detached. The cartridge including the tape roll 40 may be attached and detached as a container. In the case that, for example, a laminate tape is a target, the tape roll holder part 36 is adapted to have the tape roll 40 that supports six types of tape width of 6 mm, 9 mm, 12 mm, 18 mm, 24 mm, and 36 mm of the print-receiving tape T, attached thereto.

The feeder 37 is disposed facing the printing head 38 and feeds the print-receiving tape T fed out from the tape roll 40. The feeder 37 can include, for example, a roller not shown and the like to discharge the label L cut off by the cutters 39.

The printing head 38 performs formation of a print for the print-receiving tape T fed by the feeder 37.

For example, the cutters 39 are disposed on the front side and the back side of the print-receiving tape T sandwiching the print-receiving tape T therebetween and cut off (at least either fully cutting or half-cutting) the print-receiving tape T after the printing into a desired length using at least one thereof as a movable blade to produce the label L.

<Template>

When the label L is produced using the printer 3 on the basis of an operation of the user (for example, an editor operation) using the operation terminal 2 as above, it is very complicated for the user to manually set the overall content of the print for the label L. Plural templates each including a print object (described later in detail) enabling a desired layout corresponding to the tape width and the like of the print-receiving tape T, that is allocated in a desired aspect (such as the font type, the font size, and vertical writing or horizontal writing) are prepared and are stored in the large-capacity storage device 26 of the operation terminal 2 or the memory 33 of the printer 3.

When the user performs a proper operation at a proper timing on the operation terminal 2, plural template images are displayed on the displaying part 22 of the operation terminal 2. For example, the six types of template having the tape widths of 6 mm, 9 mm, 12 mm, 18 mm, 24 mm, and 36 mm are used for the template. In the case that the print-receiving tape T having the tape width of 36 mm is used as an example, "n" extraction print zones for which the other types of print-receiving tape of 6 to 24 mm can be combined with each other can be disposed on the template.

The user selects a template image suitable for the intended print aspect from the plural template images displayed on the displaying part 22 and thereafter properly edits the content of the print object (such as texts and images whose details will be described later) and the like to be included (printed) in the template that corresponds to the template image, and the user can thereby easily produce the desired label L.

<Technical Problem>

When the user selects a template, the plural template images are usually displayed on the displaying part 22 as a list. A rich variety of templates are recently being produced and printing can also be performed for each of plural points on one label L.

For example, in the printer 3, the tape roll 40 of the print-receiving tape T is attached to the tape roll holder part 36, the print-receiving tape T supplied from the tape roll 40 attached to the tape roll holder part 36 is fed by the feeder 37, and printing is performed for the print-receiving tape T by the printing head 38 in the course of this feeding. During this, the control of these driving systems is controlled by the CPU 32 using the application software installed in advance in the memory 33.

On the other hand, the memory 33 stores therein data in relation to many templates that each define arrangement (a layout) of characters and the like corresponding to the size and the like of the print-receiving tape T, such that a desired printing result can easily be acquired when the printing is performed for the print-receiving tape T.

As a result, for example, the user can produce the desired print data that uses the template, using the operation terminal 2 such as a personal computer, and the displaying part (such as the displaying part 22) and the operation part (such as the operation part 21 or 31) that are arranged on the printer 3.

For the printer 3, for example, the size in the width direction of the printable (applicable) print-receiving tape T (hereinafter, referred to as "tape width") is fixed in advance (to be, for example, six types of 6 mm, 9 mm, 12 mm, 18 mm, 24 mm, and 36 mm). Corresponding to this, the memory 33 can store therein a template P having a layout (arrangement) including plural extraction print zones PE (such as, for example, PE1-PE3 and PE4-PE6) whose formats are different from each other as shown in, for example, FIG. 3 in accordance with the tape width thereof. In the above, it can be assumed for the expression "the formats differ" that the fact such as that font types and sizes, or the vertical writing and the horizontal writing are present being mixed with each other. For the convenience of showing, in the following description, the description will be made handling the template P and the label L as the same item.

Figure 3A:
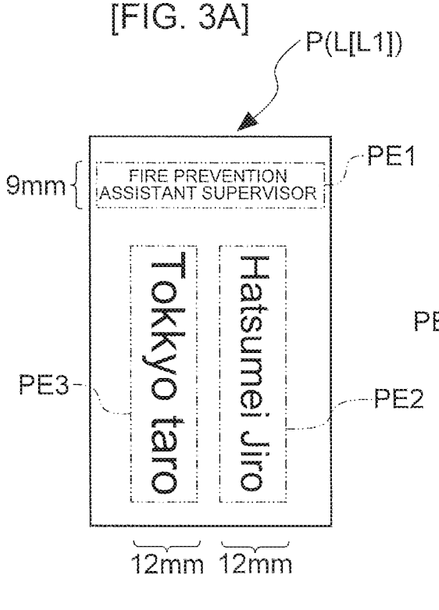
FIG. 3A is an explanatory view showing the correspondence relation between a template and a label for the case of a sign label.

For example, as shown in FIG. 3A, the template P can be established as a templet to produce a sign label L whose layout is set to print a print object "Fire Prevention Assistant Supervisor" in horizontal writing" in the extraction print zone PE1 and to print thereunder print objects "name of supervisors (names)" of two persons as the main and the sub supervisors in the equal font size in vertical writing in the two extraction print zones PE2 and PE3 adjacent to each other.

Figure 3B:
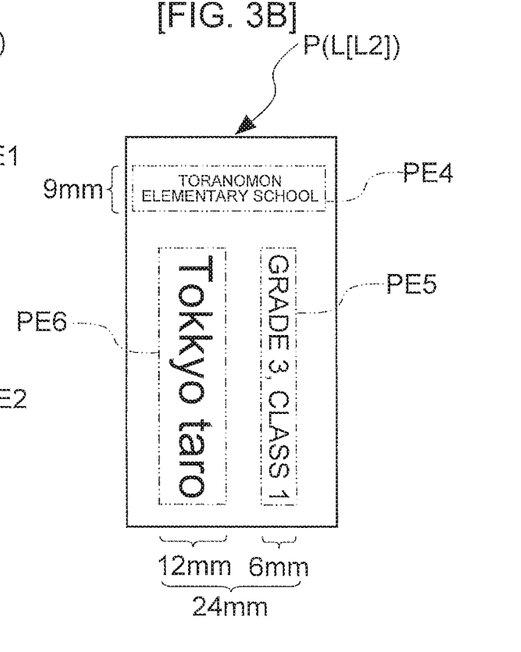
FIG. 3B is an explanatory view showing the correspondence relation between a template and a label for the case of a name tag label.

As shown in FIG. 3B, the template P can be established as a template to produce a name tag label L whose layout is set to print a print object "name of school" in horizontal writing in the extraction print zone PE4 and to print thereunder print objects "grade and class" and "name" in different font sizes in vertical writing respectively in the extraction print zones PE5 and PE6 adjacent to each other.

As above, the memory 33 stores therein the templates each having N (N: a natural number) extraction print zones PE each capable of arranging therein a print object in a specific format (such as vertical writing or horizontal writing, various types of font, and with or without decoration), allocated therein in a desired aspect.

Figure 4:
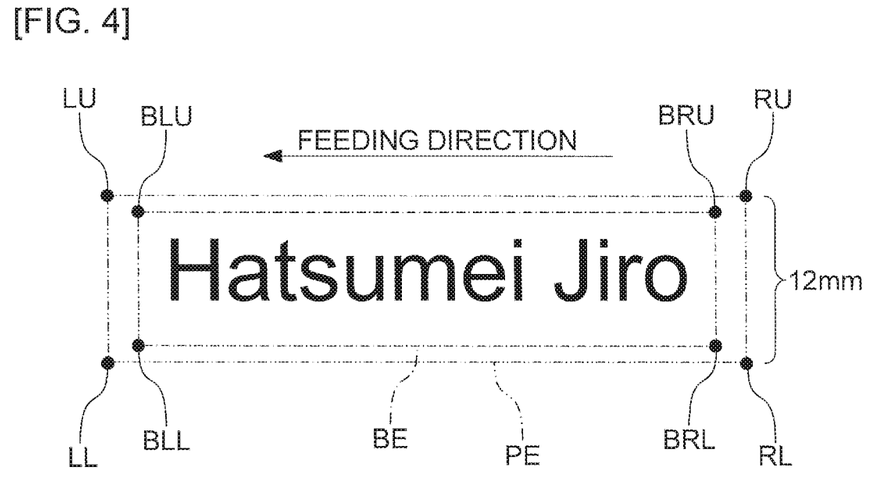
FIG. 4 is an explanatory view of size recognition for an extraction print zone.

The N extraction print zones PE are arranged in the overall one template P and each thereof can be assigned as an independent template print zone. The extraction print zone PE can also be used alone as a template for a desired tape width. For example, as shown in FIG. 4, relative to the feeding direction of the print-receiving tape T, the extraction print zone PE therefore has the X- and the Y-coordinates of LU at upper left and those of LL at lower left on the downstream side (the printing starting side) in the feeding direction and the X- and the Y-coordinates of RU at upper right on and those of RL at lower right on the upstream side (the printing ending side) in the feeding direction relative to the tape width (such as, for example, 12 mm) of the print-receiving tape T. In each of the extraction print zones PE, an input block BE for a print object that is small relative to the overall size of the extraction print zone PE is set. The input block BE is a maximal printable range for the extraction print zone PE, and points BLU, BLL, BRU, and BRL each of the X- and the Y-coordinates are defined at the four corners of the input block BE.

As above, in the case that a print object of a zone same as any one of the N extraction print zones is stored in the memory 33, this print object is usable as the print object for the extraction print zone PE of the template P.

In the case that a portion of an original label is corrected and another portion thereof is further changed, the case may therefore be present that newly printing again the overall label for correction more alleviates the degradation of the visual quality than performing over-bonding for each of two locations does. The case that the same print objects are assigned to the extraction print zones PE though the layouts of the templates P differ from each other is also assumed.

In the case that a print object assignable to the extraction print zone PE is already stored in the memory 33, time and efforts for inputting can be saved by using this print object also as a print object for the template P.

The positions of points PLU, PLL, RRU, and PRL are variable each in the direction to reduce the printable range relative to the maximal printable range. The positions are variable on the basis of the font size and the number of the characters, or right justification, left justification, center justification (centering), equal spacing, vertical writing, horizontal writing, and the like in the print object. The number of the characters and the number of the lines are optional on the basis of the font size and the like with the maximal printable range as the upper limit.

In the case of the sign label L and the name tag label L described above, the fire prevention assistant supervisors, the grade and the class, and the like may be changed due to a change of the person in charge, advancement in grade, and the like. For this, for example, in the case that the "Fire Prevention Assistant Supervisor" and the one "name" are not changed and only the other "name" is changed, or the case that the "name of the school" and the "name" are not changed and only the "grade and class" is changed, it is concerned that a consumable such as the print-receiving tape T is wasted when the overall printing is newly performed for a wide-width print-receiving tape T.

<Feature of this Embodiment>

A feature of this embodiment lies in an approach for the printer 3 to produce a minimal new over-bonding label L suppressing any consumption of the print-receiving tape T in the case that the print content of the previously printed label L is desired to be changed (to be replaced by bonding a new label thereto) using an owned (assumed) print-receiving tape T. The details of the approach will be described below.

As above, the printer 3 includes the tape roll holder part 36 to/from which the tape roll 40 of the print-receiving tape T is attached and detached, the feeder 37 that feeds the print-receiving tape T supplied from the tape roll 40 attached to the tape roll holder part 36, the printing head 38 that performs printing for the print-receiving tape T fed by the feeder 37, the CPU 32, and the memory 33 that stores therein the templates each having N (N: a natural number) extraction print zones each capable of arranging therein a print object (text characters, a symbol, or an image) in a specific format (such as vertical writing or horizontal writing, various types of font, and with or without decoration), allocated therein in a desired aspect.

In the printer 3 having the above basic configuration, the CPU 32 performs a width acquisition process of acquiring a first width direction dimension (such as, for example, 12 mm) of the print-receiving tape T in the tape role 40 attached to the tape roll holder part 36 (the flow steps described later); a width determination process of determining the magnitude relation between the first width direction dimension (such as, for example, 12 mm) acquired in the width acquisition process and a second width direction dimension (such as, for example, 36 mm) correlated with a template stored in the memory 33 (the flow steps described later); a first printing determination process of determining whether or not printing using the N or less extraction print zones is performable on the basis of a third width direction dimension (such as, for example, 12 mm or 9 mm) correlated with an extraction print zone included in a template and the first width direction dimension (such as, for example, 12 mm) in the case that it is determined in the width determination process that the first width direction dimension (such as for example, 12 mm) is smaller than the second width direction dimension (such as, for example, 36 mm) (the flow steps described later); and a first print formation process of controlling the printing head 38 and the feeder 37 to form a print using a print object arranged in the extraction print zone on the print-receiving tape T in the case that it is determined in the first printing determination process that the printing using the extraction print zone is performable (the flow steps described later), (the details thereof will be described later).

The CPU 32 performs print control to print the print object in the range of an input block BE set to be somewhat smaller than the width of the extraction print zone PE in the previously printed label L. As a result, when a portion of the previously printed label L is desired to be changed, an over-bonding label L using a print-receiving tape T whose tape width is larger than at least that of an input block BE of the extraction print zone PE that corresponds to the target to be changed is produced and the over-bonding can thereby be performed in an orderly manner without leaving any print object thereunder before the change outside the label L.

<Examples of Application of Over-Bonding Label (Normal)>

Figure 5A:
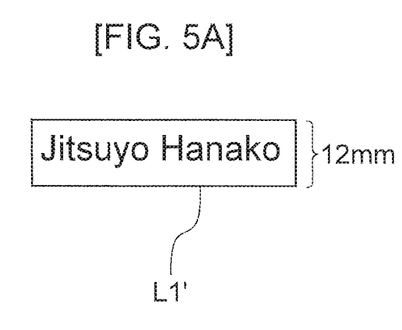
FIG. 5A is an explanatory view of an over-bonding label corresponding to one extraction print zone, showing the case that a portion of the sign label is changed.
Figure 5B:
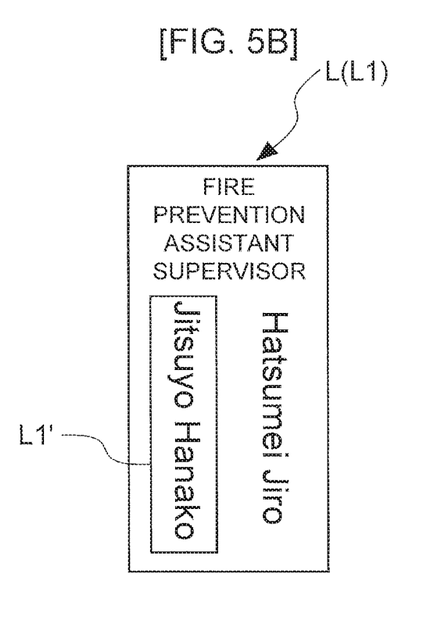
FIG. 5B is an explanatory view of the state where the over-bonding label is over-bonded to a portion of the sign label, showing the case that the portion of the sign label is changed.

For example, as shown in FIG. 5A, the CPU 32 produces a new over-bonding label L1' using the extraction print zone PE3 (see FIG. 3A) included in the template P for the label L1. As a result, as shown in FIG. 5B, the user can over-bond the over-bonding label L1' having "name of supervisor (name: Jitsuyo Hanko")" newly taking the post of the supervisor printed thereon to the one "name of supervisor (name: Tokkyo Taro") of the previously produced label L1.

Figure 6A:
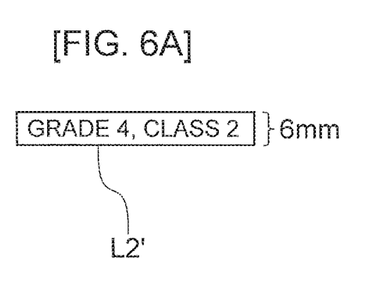
FIG. 6A is an explanatory view of an over-bonding label corresponding to one extraction print zone, showing the case that a portion of the name plate label is changed.
Figure 6B:
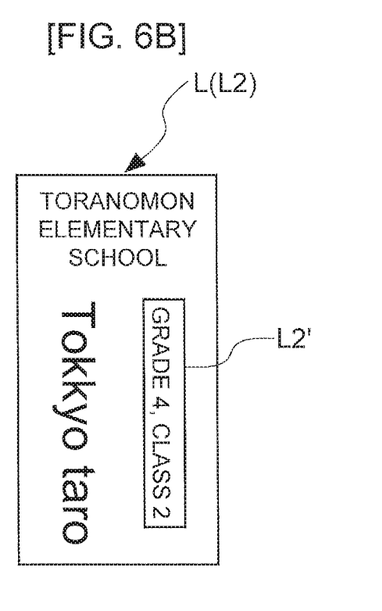
FIG. 6B is an explanatory view of the state where the over-bonding label is over-bonded to a portion of the name tag label, showing the case that the portion of the name tag label is changed.

Similarly, as shown in FIG. 6A, the CPU 32 produces a new over-bonding label L2' using the extraction print zone PE5 (see FIG. 3) included in the template P for the label L2. As a result, as shown in FIG. 6B, the user can over-bond the over-bonding label L2' having the new "grade and class ("Fourth Grade, Class 2")" as a result of advancement in grade printed thereon to "grade and class (Third Grade, Class 1")" of the previously produced label L2.

<Example of Application of Over-Bonding Label (Composite 1)>

The over-bonding is not limited to the case that one extraction print zone PE is the target. For example, in the case of the name tag label L2 shown in FIG. 3B, the extraction print zone PE5 (of, for example, 6 mm) and the extraction print zone PE6 (of, for example, 12 mm) are in the relation to be adjacent to each other sandwiching a margin (of, for example, 6 mm) therebetween.

For example, the case that the extraction print zones PE5 and PE6 at the two points are desired to simultaneously be changed may be present such as the case that the name becomes sickly (or is written in Chinese characters changed from Japanese syllabary characters) simultaneously with the advancement in grade.

Figure 7A:
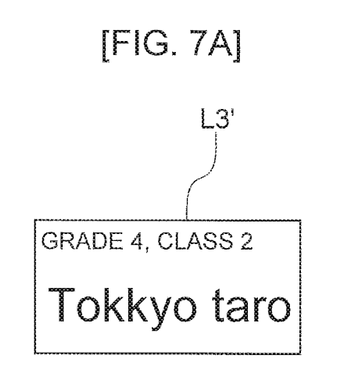
FIG. 7A is an explanatory view of an over-bonding label corresponding to two extraction print zones that are adjacent to each other, showing the case that a portion of the name tag label is changed.
Figure 7B:
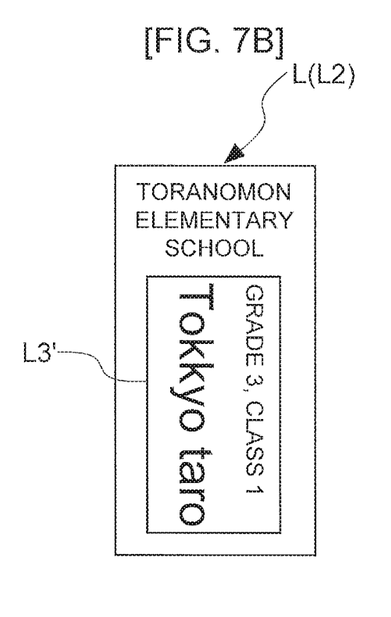
FIG. 7B is an explanatory view of the state where the over-bonding label is over-bonded to a portion of the name tag label, showing the case that the portion of the name tag label is changed.

In such a case, for the extraction print zones PE5 and PE6 including the margin, the CPU 32 can produce an over-bonding label L3' having the two print objects after the simultaneous change printed thereon as shown in FIG. 7A only when the print-receiving tape T having the tape width of 24 mm is used. As a result, as shown in FIG. 7B, the user can over-bond the over-bonding label L3' having the new "grade and class ("Grade 4, Class 2")" set by the advancement in grade and "name" printed thereon to the "grade and class ("Grade 3, Class 1")" and "name" of the previously produced label L2.

<Example of Application of Over-Bonding Label (Composite 2)>

Figure 8A:
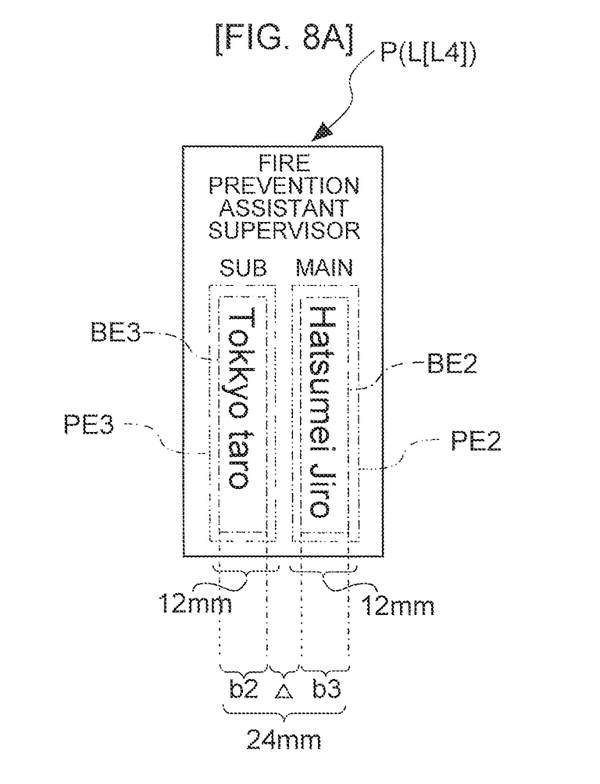
FIG. 8A is an explanatory view showing the relation between two extraction print zones that are adjacent to each other sandwiching the margin therebetween and an input block, showing the case that a portion of the sign label is changed.

For example, as shown in FIG. 8A, in the case that the width of each of the two extraction print zones PE2 and PE3 adjacent to each other is 12 mm and a margin is present therebetween, printing using the print-receiving tape T having the tape width of 24 mm is not performable.

Figures 8B, 8C:
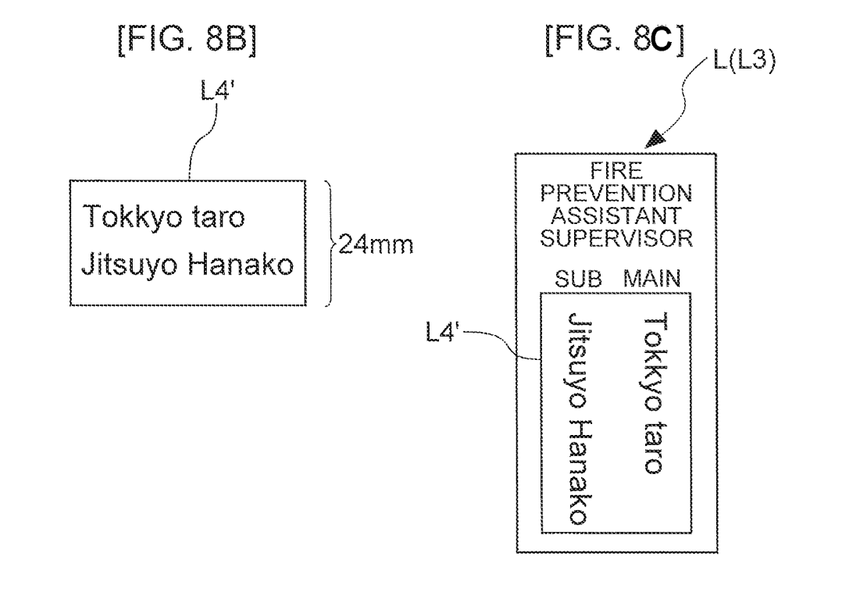
FIG. 8B is an explanatory view of an over-bonding label corresponding to the two extraction print zones that are adjacent to each other, showing the case that a portion of the sign label is changed.
FIG. 8C is an explanatory view of the state where the over-bonding label is over-bonded to a portion of the sign label, showing the case that the portion of the sign label is changed.

Even in this case, only when the total of the sum of the maximal widths b2 and b3 respectively of input blocks BE2 and BE3 of the adjacent extraction print zones PE2 and PE3, and the margin Δ therebetween is equal to or smaller than the tape width of the print-receiving tape T (such as, for example, 24 mm or smaller), the CPU 32 however can perform printing of the print object that includes the two extraction print zones PE2 and PE3 and can produce one over-bonding label L4' as shown in FIG. 8B. As a result, as shown in FIG. 5B, the user can over-bond the over-bonding label L4' having "name of supervisors (names: "Tokkyo Taro" and "Jitsuyo Hanako") newly taking the posts of the main and the sub supervisors printed thereon to "name of supervisors (names: "Hatsumei Jiro" and "Tokkyo Taro") of two persons of the previously produced label L2.

<Example of Application of Over-Bonding Label (Composite 3)>

Figure 9A:
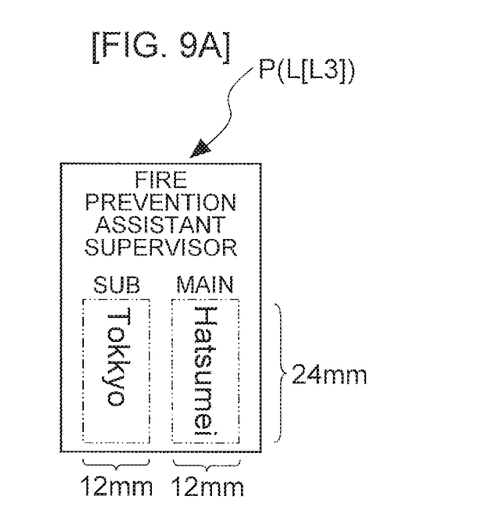
FIG. 9A is an explanatory view showing the relation between the two extraction print zones that are adjacent to each other sandwiching the margin therebetween and an input block, showing the case that a portion of the sign label is changed.

For example, as shown in FIG. 9A, in the case that the width of each of the two extraction print zones adjacent to each other of the previous label 3 is 12 mm and a margin is present therebetween, printing using the print-receiving tape T having the tape width of 24 mm is not performable.

Figure 9B:
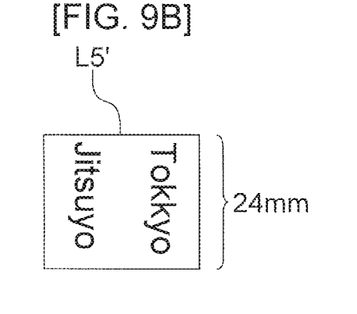
FIG. 9B is an explanatory view of an over-bonding label corresponding to the two extraction print zones that are adjacent to each other, showing the case that a portion of the sign label is changed.
Figure 9C:
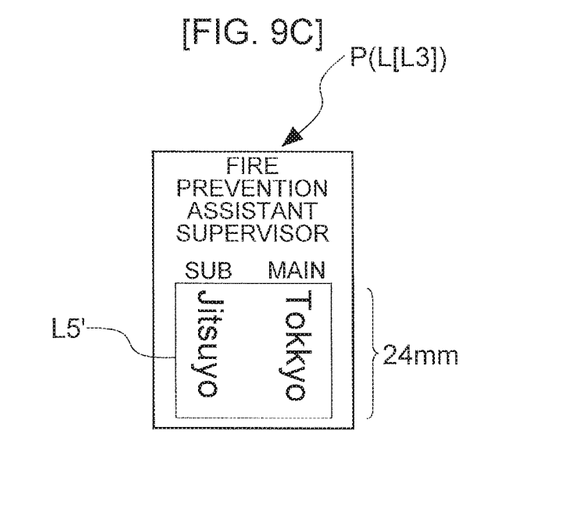
FIG. 9C is an explanatory view of the state where the over-bonding label is over-bonded to a portion of the sign label, showing the case that the portion of the sign label is changed.

Even in this case, the CPU 32 however can perform printing of a print object that includes the two extraction print zones and can produce one over-bonding label L5' as shown in FIG. 9B only when the tape width in the direction perpendicular to the direction of the adjacence, that is, the dimension of the extraction print zones in the tape length direction is equal to or smaller than the tape width of the print-receiving tape T (such as, for example, 24 mm or smaller). As a result, as shown in FIG. 9C, the user can over-bond the over-bonding label L5' having "name of supervisors (names: "Tokkyo Taro" and "Jitsuyo Hanako") newly taking the posts of the main and the sub supervisors printed thereon to "name of supervisors (names: "Hatsumei Jiro" and "Tokkyo Taro") of the two persons of the previously produced label L3.

<Example of Application of Over-Bonding Label (Substitution 1)>

For example, for the template P used in the case that the previous label L1 described with reference to FIG. 3A is produced, the case that "Fire Prevention Assistant Supervisor" having the tape width of 9 mm corresponding to the extraction print zone PE1 and "name" of each of the two persons, having the tape width of 12 mm corresponding to the extraction print zones PE2 and PE3 are printed as the print objects has been described. For example, in the case that any stock of the print-receiving tape of 9 mm is exhausted, the over-bonding label for "Fire Prevention Assistant Supervisor" cannot be produced.

Figure 10A:
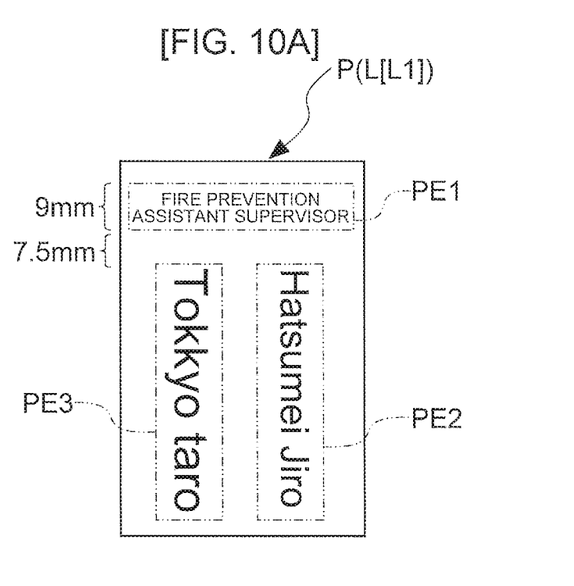
FIG. 10A is an explanatory view showing the relation between the extraction print zones and the margin, showing the case that a portion of the sign label is changed.
Figures 10B, 10C:
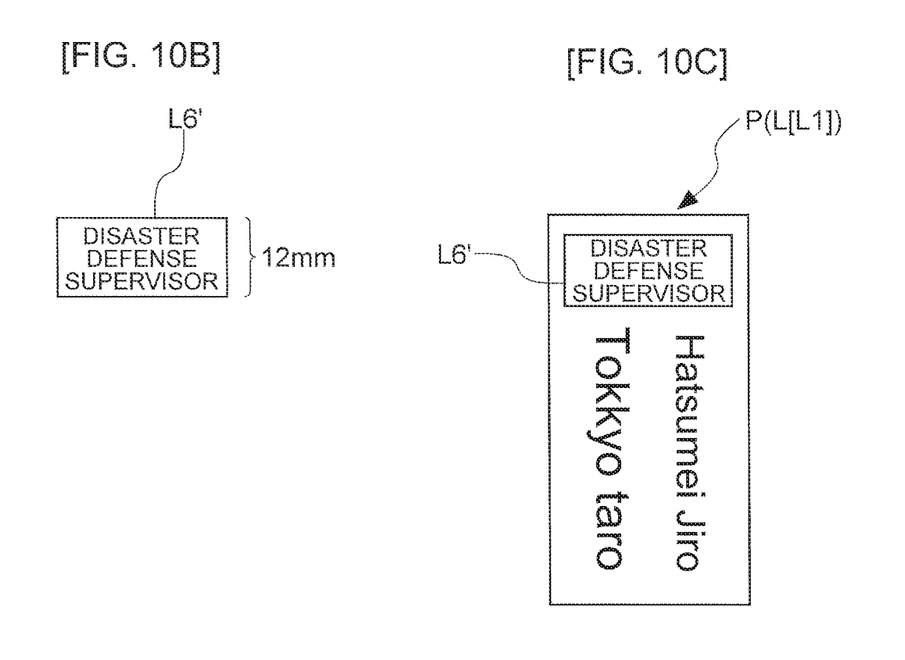
FIG. 10B is an explanatory view of an over-bonding label corresponding to the extraction print zones, that includes the margin, showing the case that a portion of the sign label is changed.
FIG. 10C is an explanatory view of the state where the over-bonding label is over-bonded to a portion of the sign label, showing the case that the portion of the sign label is changed.

In this case, the CPU 32 however can perform printing of the print object for the extraction print zone PE1 using the print-receiving tape T having the tape width of 12 mm and can produce one over-bonding label L6' as shown in FIG. 10B only when the margin between the extraction print zones PE2 and PE3 is 6 mm or larger (such as, for example, 7.5 mm) under the extraction print zone PE1 as shown in FIG. 10A. As a result, as shown in FIG. 10C, the user can over-bond the over-bonding label L6' having the newly changed "Disaster Defense Supervisor" printed thereon to "Fire Prevention Assistant Supervisor" on the previously produced label L1 avoiding any overlapping on the extraction print zones PE3 and PE2. In such a case, the arrangement of the print objects for the over-bonding label L6' of "Disaster Defense Supervisor" may be the same as the arrangement of the original "Fire Prevention Assistant Supervisor", or may be arrangement formed by adjusting the balance thereof against the overall over-bonding label L6'. For example, new print objects of "Main" and "Sub" may be added.

<Control Means>

Control steps performed by the CPU 32 of the printer 3 to realize the above approach will be described below with reference to FIG. 11. In FIG. 11, the processes shown in this flowchart is started triggered by the fact that a print start operation is performed by the user after a change operation for print objects is performed thereby. In the change operation for the print objects by the user, for example, the template before the change and the print objects corresponding to all the (N) extraction print zones PE are caused to be displayed on the displaying part 22 of the operation terminal 2, and the print objects after the change are input by the user into one or more (and N or less) extraction print zones PE to be changed.

At step S10, the CPU 32 first performs the width acquisition process of acquiring the first width direction dimension (in FIG. 11, that is simply referred to as "first width" and the same will hereinafter be applied) of the print-receiving tape T in the tape roll 40 attached to the tape roll holder part 36, from the sensor 35. The CPU 32 temporarily stores the acquired dimension data of the first width direction dimension in the memory 33 and thereafter moves its processing to step S20.

At step S20, the CPU 32 next performs the width determination process of determining the magnitude relation between the first width direction dimension acquired in the width acquisition process at step S10 (and stored in the memory 33) and the second width direction dimension correlated with the template P stored in advance in the memory 33. In this embodiment, the CPU 32 performs an equal width determination step (step S21) at which whether or not the first width direction dimension is equal to the second width direction dimension is determined, and a smaller width determination step (step S22) at which whether or not the first width direction dimension is smaller than the second width direction dimension is determined.

In the case that the CPU 32 determines at the equal width determination step at step S21 that the first width direction dimension is equal to the second width direction dimension, the CPU 32 moves its processing to step S30. In the case that the CPU 32 does not determine at the equal width determination step at step S21 that the first width direction dimension is equal to the second width direction dimension, the CPU 32 moves its processing to step S22.

At step S30, on the basis of the fact that the first width direction dimension of the print-receiving tape T in the tape roll 40 attached to the tape roll holder part 36 (such as, for example, 36 mm) and the second width direction dimension of the template P (such as, for example, 36 mm) are equal to each other, the CPU 32 performs a second print formation process of controlling the printing head 38 and the feeder 37 to form the print using all the print objects including the changed extraction print zones and the extraction print zones not changed, and thereby forming the print using the overall template P including the N extraction print zones on the print-receiving tape T.

This second print formation process at step S30 has the following meaning. In this case, for example, the case that the tape width of the print-receiving tape T attached to the tape roll holder part 36 is equal to that of the original template P, the case that the points for the correction (the change) are also not one, or the case that the label is desired to be newly printed out associated with its degradation or the like (irrespective of presence or absence of any change of the content) is assumed.

The convenience of prior art is therefore guaranteed by using the original template P and producing the label L by using this template P as it is or correcting the template P (making a change thereto) in the case that the tape width of the print-receiving tape T of the tape roll 40 attached to the tape roll holder part 36 is equal to that of the template P.

In the second print formation process at step S30, in accordance with the fact that it is determined that the first width direction dimension (such as, for example, 36 mm) is equal to the second width direction dimension (such as, for example, 36 mm), frame line prints matching with the N extraction print zones may be formed on the label L (a sixth print formation process) not shown.

In this case, in accordance with the case that the maximal tape width defined by the template P and the tape width of the print-receiving tape T set in the printer 3 are equal to each other, the over-bonding can be facilitated by printing the frame lines as glue-margin lines.

On the other hand, in the case that the CPU 32 determines at the smaller width determination step at step S22 that the first width direction dimension (such as, for example, 12 mm) is smaller than the second width direction dimension (such as, for example, 36 mm), the CPU 32 moves its processing to step S40. In the case that the CPU 32 does not determine at the smaller width determination step at step S22 that the first width direction dimension is smaller than the second width direction dimension, because denial is made at the equal width determination step at step S21 and denial is also made at the smaller width determination step at step S22, the CPU 32 determines that the printing is unable to be performed and causes this routine to come to an end because the first width direction dimension is larger than the second width direction dimension. The CPU 32 may make an error announcement before causing the routine to come to an end. Independently from or concurrently with this error announcement, the CPU 32 may perform printing the print objects included in the extraction print zones of the overall template P, as the targets.

At step S40, on the basis of the third width direction dimension correlated with the extraction print zone included in the template P and the first width direction dimension, the CPU 32 performs a printing determination process of determining whether or not printing using N or less extraction print zones is performable.

In this embodiment, for the change operation for the print objects by the user before the start of this routine, in the case that the number (N) of the extraction print zones PE assigned to the template P is plural, the CPU 32 performs the printing determination process that differs depending on whether or not the extraction print zone(s) corresponding to the changed object(s) is/are one extraction print zone or plural (N-1 or less) extraction print zones adjacent to each other. In the case that the number (N) of the extraction print zone assigned to the template P is one, the CPU 32 performs the process at step S30 because the extraction print zone matches with the target to be changed of the print object. At step S40, in the case that the extraction print zone PE corresponding to the print object changed at step S41 is one of the plural extraction print zones PE (step S41:YES), the CPU 32 performs a first printing determination process at step S43 and a fourth printing determination process at step S44 and step S45. In the case that the extraction print zones PE corresponding to the print objects changed at step S41 are not one (step S41:NO), when these extraction print zones PE are in an adjacence relation (step S42:YES), the CPU 32 performs a second printing determination process at step S47 described later. In the case that the extraction print zones PE are plural and are not in any adjacence relation at step S42 (step S42:NO), the CPU 32 determines that the printing is not performable and causes this routine to come to an end.

In the first printing determination process at step S43, the CPU 32 determines whether or not printing using the extraction print zones is performable on the basis of the fact as to whether or not the first width direction dimension (such as, for example, 12 mm) and the third width direction dimension (such as, for example, 12 mm) are equal to each other. In this example, for this determination, for example, the CPU 32 determines whether or not the first width direction dimension and the third width direction dimension are equal to each other. In the case that the CPU 32 determines that these dimensions are equal to each other, the CPU 32 moves its processing to step S50. In the case that the CPU 32 does not determine that the first width direction dimension and the third width direction dimension are equal to each other, the CPU 32 moves its processing to the fourth printing determination process at step S44.

At step S50, the CPU 32 performs control for the driving system to control the printing head 38 and the feeder 37 to form the print using the print objects arranged in the extraction print zones PE on the print-receiving tape T (the first print formation process).

As a result, the label L having only the changed portion printed thereon can be produced and the over-bonding label L can easily be produced suppressing any consumption of the print-receiving tape T.

At step S44, the CPU 32 determines whether or not the first width direction dimension (such as, for example, 18 mm) is larger than the third width direction dimension (such as, for example, 12 mm). In the case that the CPU 32 determines that the first width direction dimension (such as, for example, 18 mm) is larger than the third width direction dimension (such as, for example, 12 mm), the CPU 32 moves its processing to step S45. In the case that the CPU 32 does not determine that the first width direction dimension (such as, for example, 18 mm) is larger than the third width direction dimension (such as, for example, 12 mm), the CPU 32 causes this routine to come to an end because the first width direction dimension (such as, for example, 9 mm) is smaller than the third width direction dimension (such as, for example, 12 mm) in the light of the denying determination that the first width direction dimension (such as, for example, 12 mm) and the third width direction dimension (such as, for example, 12 mm) are not equal to each other in the first printing determination process at step S43.

At step S45, the CPU 32 determines whether or not printing using the extraction print zones is performable on the basis of the determination as to whether or not printing not overlapping with the extraction print zones other than the extraction print zones PE whose print objects are to be changed of the extraction print zones PE arranged in the template P is performable. In the case that the CPU 32 determines that the printing using the extraction print zones is performable, the CPU 32 moves its processing to step S50. In the case that the CPU 32 does not determine that the printing using the extraction print zones is performable, the CPU 32 determines that the printing is not performable and causes this routine to come to an end.

As step S50, the CPU 32 performs control for the driving system to control the printing head 38 and the feeder 37 to form the print using the print objects arranged in the extraction print zones PE on the print-receiving tape T (a fifth print formation process).

As a result, the label L having only the changed portion printed thereon is produced.

In the case that the types of the tape width of the stocked print-receiving tapes T are a few, newly purchasing the print-receiving tape T having the tape width not stocked at hand needs time and efforts.

When no significant trouble arises even though the print-receiving tape T whose width is larger than the width in the tape width direction of the extraction print zones assigned to a location for the correction (the change) is used, the time and the cost to newly purchase a print-receiving tape T having the tape width not available at hand can be reduced.

The first width direction dimension (such as, for example, 18 mm) of the print-receiving tape T attached to the tape roll holder part 36 is therefore acquired and the magnitude relation between the acquired first width direction dimension (such as, for example, 18 mm) and the second width direction dimension (such as, for example, 36 mm) is determined and, thereafter, in the case that the first width direction dimension (such as, for example, 18 mm) is smaller than the second width direction dimension (such as, for example, 36 mm) and the first width direction dimension (such as, for example, 18 mm) is larger than the third width direction dimension (such as, for example, 12 mm), the fourth printing determination process of determining whether or not the printing for the N or less extraction print zones is performable is performed on the basis of the third width direction dimension (such as, for example, 12 mm) correlated with the extraction print zone included in the template P and the first width direction dimension (such as, for example, 18 mm). In the case that it is determined that the printing using the extraction print zones is performable in the fourth printing determination process, the printing head 38 and the feeder 37 are controlled to form the print that uses the print objects arranged in the extraction print zones PE on the print-receiving tape T (the fifth print formation process).

As a result, the time and the cost to newly purchase a print-receiving tape T having the tape width not available at hand can be saved. When the determination at step S44 is satisfied, step S50 may be performed without performing step S45. In this case, the third printing determination process is performed at step S44 and the fourth print formation process is performed at step S50. In this case, in the case that the over-bonding label L overlaps on the print object adjacent thereto, the label L is made available by manually cutting the overlapping portion of the label L by the user.

On the other hand, in the second printing determination process at step S47, the CPU 32 acquires the fourth width direction dimension correlated with the extraction print zones (such as, for example, the extraction print zones PE5 and PE6 in FIG. 3B) adjacent to each other and included in the template P and thereafter determines whether or not printing using the N or less extraction print zones adjacent to each other is performable on the basis of the fourth width direction dimension (such as, for example, 12 mm+6 mm+margin=24 mm) and the first width direction dimension (such as, for example, 24 mm). The fourth width direction dimension in the above can easily be calculated (or stored in the memory 33 as known dimension data) including the determination as to in which direction the tape width of the print-receiving tape T is taken, because the dimensions of the extraction print zones PE in the adjacence relation are defined by the template P (see FIG. 3 and FIG. 7 to FIG. 9 described above). In this example, for example, the CPU 32 determines whether or not the first width direction dimension and the fourth width direction dimension are equal to each other. In the case that the CPU 32 determines that the first width direction dimension=the fourth width direction dimension is established, the CPU 32 moves its processing to step S50. In the case that the CPU 32 determines that the first width direction dimension=the fourth width direction dimension is not established, the CPU 32 determines that the printing is not performable and causes this routine to come to an end.

At step S50, the CPU 32 performs the control for the driving system to control the printing head 38 and the feeder 37 to form the print using the print object arranged in the extraction print zone PE on the print-receiving tape T (a third print formation process).

As a result, the label L having only the changed portion printed thereon is produced.

In the case that the contents to be corrected (changed) are present at plural points, in the case that the extraction print zones PE on the template P that correspond to the correction points are adjacent to each other, it is troublesome that printing sessions for the contents are performed separately from each other each using a narrow-width print-receiving tape T and the over-bonding sessions are performed separately from each other.

When the contents to be corrected are in an adjacence relation on the template P, and when the width acquired by adding those of the adjacent extraction print zones PE to each other is equal to or smaller than the tape width (it is preferred that the adjacent margins be included therein) of the print-receiving tape T set in the printer 3, time and efforts for the printing and the over-bonding can be reduced by concurrently performing the printing for one print-receiving tape T using the above approach.

The first width direction dimension (such as, for example, 24 mm) of the print-receiving tape T attached to the tape roll holder part 36 is therefore acquired, the magnitude relation between the first width direction dimension (such as, for example, 24 mm) and the second width direction dimension (such as, for example, 36 mm) correlated with the template P is determined, and, thereafter, in the case that the printing using the adjacent extraction print zones is performable on the basis of the fourth width direction dimension (such as, for example, 12 mm+6 mm+the margin=24 mm) correlated with the adjacent extraction print zones and the first width direction dimension (such as, for example, 24 mm), the printing head 38 and the feeding device 37 are controlled to form the print using the print objects arranged in the adjacent extraction print zones (the extraction print zones PE5 and PE6) on the print-receiving tape T having the first width dimension.

As a result, in the case that N is three or larger or the like, two or more (N-1) adjacent extraction print zones PE (the extraction print zones PE5 and PE6) can concurrently be printed. The presence of the margin may be overlooked for the adjacent extraction print zones PE.

In the case that two extraction print zones each needing a tape width of, for example, 12 mm are adjacent to each other through a margin, printing can be performed positioning the two extraction print zones close to each other assuming no presence of the margin or positioning the two extraction print zones as far as possible from each other to have the margin therebetween.

For example, in the case that one extraction print zone needing a tape width of 12 mm and one extraction print zone needing a tape width of 9 mm are adjacent to each other through a margin of 3 mm, only when the tape width of the print-receiving tape T of the tape roll 40 attached to the tape roll holder part 36 is 24 mm, printing for the adjacent two extraction print zones as they are can also be concurrently performed.

When the determination at step S47 as to whether or not the print using the N or less adjacent extraction print zones is performable on the basis of the fourth width direction dimension and the first width direction dimension is not satisfied, whether or not the print using the N or less adjacent extraction print zones is performable may similarly be determined on the basis of the length direction dimension perpendicular to the fourth width direction dimension and the first width direction dimension (the fourth printing determination process, see the examples shown in FIG. 9A to FIG. 9C described above). When this determination is satisfied, at step S50, the CPU 32 performs control for the driving system to control the printing head 38 and the feeder 37 to form the print using the print objects arranged in the extraction print zones PE on the print-receiving tape T (a seventh print formation process). In this case, similar to the above, the label having only the changed portion printed thereon (the label L5' shown in FIG. 9B) can be produced.

The present disclosure is not limited to the embodiment and various modifications can be made thereto within the scope not departing from the gist and the technical idea thereof. Such modification examples will sequentially be described below.

The description has been made taking the example where, for example, the two or the three extraction print zones PE are included in the template P (see FIGS. 3A, 3B, 8A, 10A, and the like) in the above example while the layout is not limited to these and one, or four or more extraction print zones PE may be included therein.

For example, in the case that the tape width of the previously produced label L and the tape width detected by the sensor 35 are equal to each other, the CPU 32 may perform printing for not only the portion of the changed print object but also including the print objects not changed for all the extraction print zones PE1-PE3 or the extraction print zones PE4-PE6, to produce a new over-bonding label L.

For example, in the case that the tape width detected by the sensor 35 is larger (has a larger width) than the tape width of the previously produced label L in the width acquisition process, the CPU 32 may not perform the printing after making the error announcement.

The extraction print zones PE each have a function as a single print zone. For example, the extraction print zone PE1 can have a function as a template for the print-receiving tape T having the tape width of 9 mm. The example where the printing of the print objects is enabled as single print zones of the print-receiving tape T whose tape width is small for one or more (N or more) of the plural extraction print zones PE as the targets has therefore been described in the above description while the print zone for one tape width is enabled to be available as one of the plural extraction print zones PE.

Even in the case that the dimension in the tape length direction is small, when the extraction print zone PE can cope with print objects whose font sizes are equal to each other and that have the equal number of characters, the extraction print zone PE is enabled to be substitutable by the CPU 32. At this time, the arrangement of the substitute print zones for the original template P may be shifted along the tape length direction, or either case that the X- and the Y-coordinates at the upper left LU and those at the lower left LL on the printing starting side are caused to match with each other or that the X- and the Y-coordinates at the upper right RU and those at the lower right RL on the printing ending side are caused to match with each other may be employed.

In the above description, in the case that description that the dimensions or the sizes in appearance are "same", "equal", "different", or the like are present, this description has no strict meaning. These "same", "equal", and "different" respectively mean "substantially same", "substantially equal", and "substantially different" each allowing any design tolerance and any design error.

Figure 11:
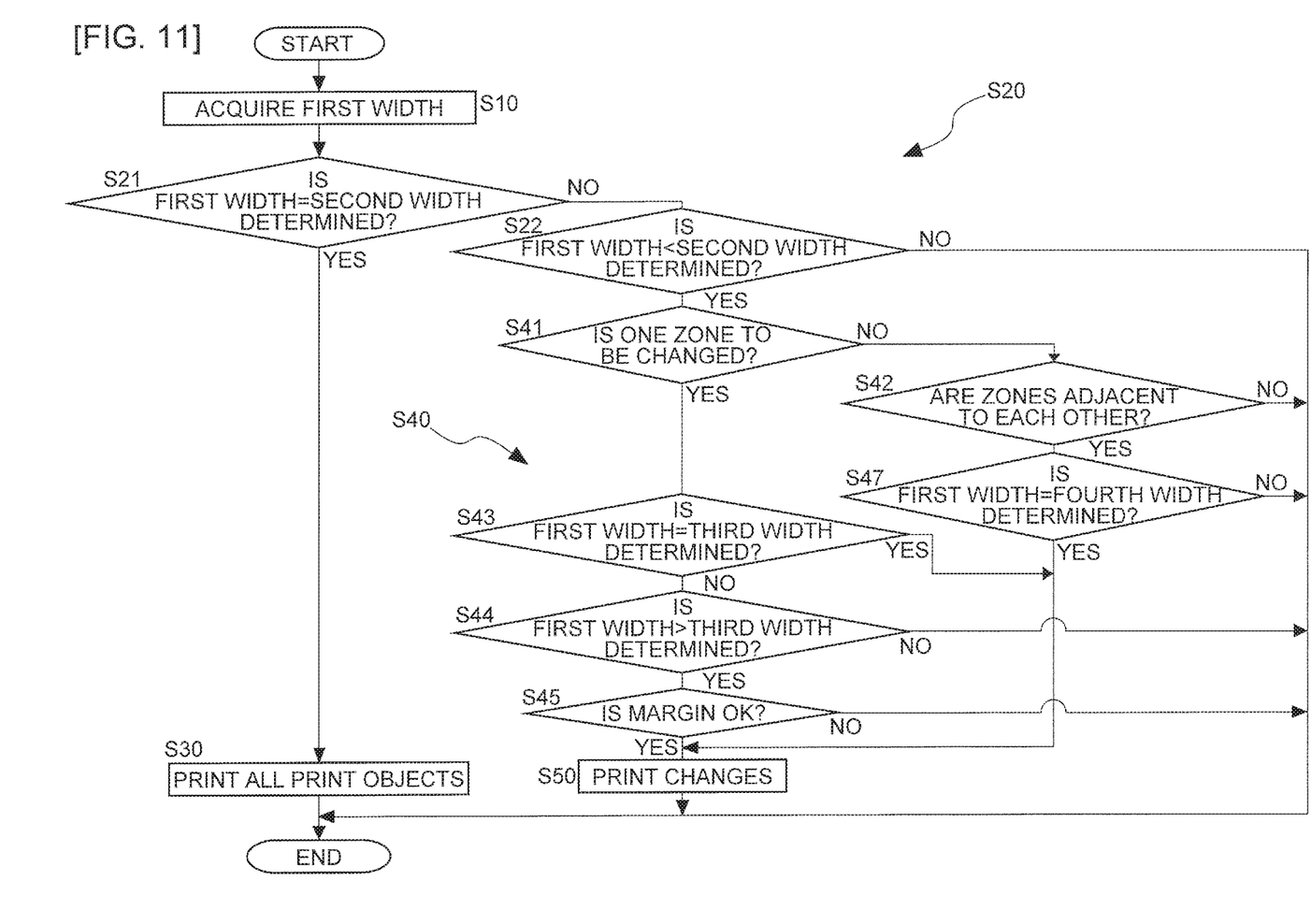
FIG. 11 is a flowchart of a routine performed by a CPU of the printer.

The flowchart shown in FIG. 11 does not limit the present disclosure to the steps shown in the flow, and any addition, any deletion, any chance of order thereof, or the like may be made to the steps within the scope not departing from the gist and the technical idea of the present disclosure.

In addition to those described above, the approaches in accordance with the embodiment and the modification examples may properly be combined with each other to be used.

Though not exemplified one by one, the present disclosure is implemented with various types of change made thereto within the scope not departing from the gist thereof.

What is claimed is:

1. A printer comprising:
   a tape roll holder configured to be attached with and detached from a container of a print-receiving tape;
   a feeder to feed said print-receiving tape supplied from said container attached to said tape roll holder;
   a printing head configured to perform printing on said print-receiving tape fed by said feeder;
   a controller; and
   a memory,
   said memory storing a template that N (N: a natural number) extraction print zones allocated in a desired mode, wherein each of said extraction print zones is capable of having a print object arranged in a specific format,
   said controller performing:
   a width acquisition process for acquiring a first width direction dimension of said print-receiving tape in said container attached to said tape roll holder;
   a width determination process for determining a magnitude relation between said first width direction dimension acquired in said width acquisition process and a second width direction dimension that is correlated with said template stored in said memory;

a first printing determination process for determining whether or not printing using N or less of the extraction print zones is performable, on the basis of a third width direction dimension correlated with said extraction print zone included in said template and said first width direction dimension in the case that it is determined in said width determination process that said first width direction dimension is smaller than said second width direction dimension; and a first print formation process for controlling said printing head and said feeder to form a print using said print object arranged in said extraction print zone on said print-receiving tape in the case that it is determined in said first printing determination process that the printing using said extraction print zones is performable.

2. The printer according to claim 1, wherein
said controller further performs
a second print formation process for controlling said printing head and said feeder to form a print using a whole of the template comprising N of the extraction print zones on said print-receiving tape in the case that it is determined in said width determination process that said first width direction dimension and said second width direction dimension are equal to each other.

3. The printer according to claim 1, wherein
said controller further performs:
a second printing determination process for, in the case that N or less of the extraction print zones adjacent each other in a tape width direction are present among said extraction print zones included in said template and it is determined in said width determination process that said first width direction dimension is smaller than said second width direction dimension, determining whether or not printing using the N or less of extraction print zones adjacent each other is performable on the basis of a fourth width direction dimension correlated with the extraction print zones adjacent each other included in said template and said first width direction dimension; and a third print formation process for controlling said printing head and said feeder to form a print using said print objects arranged in said extraction print zones adjacent each other on said print-receiving tape in the case that it is determined in said second printing determination process that the printing using the extraction print zones adjacent each other is performable.

4. The printer according to claim 1, wherein
said controller further performs:
a third printing determination process for, in the case that it is determined that said first width direction dimension is smaller than said second width direction dimension and it is determined that a third width direction dimension correlated with said extraction print zones included in said template is smaller than said first width direction dimension in said width determination process, determining whether or not printing using N or less of the extraction print zones is performable on the basis of said third width direction dimension correlated with said extraction print zones included in said template and said first width direction dimension; and a fourth print formation process for controlling said printing head and said feeder to form a print using said print objects arranged in said extraction print zones on said print-receiving tape in the case that it is determined in said third printing determination process that the printing using said extraction print zones is performable.

5. The printer according to claim 1, wherein
said controller further performs:
a fourth printing determination process for, in the case that it is determined that said first width direction dimension is smaller than said second width direction dimension and it is determined that a third width direction dimension correlated with said extraction print zones included in said template is smaller than said first width direction dimension in said width determination process, determining whether or not printing not overlapping with another extraction print zones with respect to N or less of the extraction print zones is performable on the basis of said third width direction dimension correlated with said extraction print zones included in said template and said first width direction dimension; and a fifth print formation process for controlling said printing head and said feeder to form a print using said print object arranged in said extraction print zones on said print-receiving tape in the case that it is determined in said fourth printing determination process that printing using said extraction print zones is performable.

6. The printer according to claim 3, wherein
said controller further performs:
a fourth printing determination process for, in the case that it is determined in said second printing determination process that the printing using the extraction print zones adjacent each other is not performable, determining whether or not printing using N or less of extraction print zones adjacent each other is performable on the basis of a length direction dimension perpendicular to said width direction and correlated with said extraction print zones adjacent each other included in said template and said first width direction dimension; and a seventh print formation process for controlling said printing head and said feeder to form a print using said print objects arranged in said extraction print zones adjacent each other on said print-receiving tape in the case that it is determined in said fourth printing determination process that the printing using the adjacent extraction print zones adjacent each other is performable.

7. The printer according to claim 1, wherein
said controller further performs
a sixth print formation process for forming frame line prints corresponding to N of the extraction print zones in the case that it is determined in said width determination process that said first width direction dimension is equal to said second width direction dimension.

8. The printer according to claim 1, wherein
said controller is configured to, in the case that said memory stores said print object of a zone same as any one of the N of extraction print zones, use the print object as a print object for said extraction print zone of said template.

* * * * *